US005755006A

United States Patent [19]
Botting et al.

[11] Patent Number: 5,755,006
[45] Date of Patent: May 26, 1998

[54] TRANSPORT PLATFORM AND RELATED CARPET CLEANING MACHINE

[75] Inventors: Gregory J. Botting; Paul E. Fiegel; Norman K. Harris; David G. Jansson; Ernest W. Middleton, all of Racine; Mark A. Pleshek, Milwaukee; Timothy B. Strandell, Racine, all of Wis.

[73] Assignee: Racine Industries, Inc., Racine, Wis.

[21] Appl. No.: 731,544

[22] Filed: Oct. 15, 1996

[51] Int. Cl.6 ........................................................ A47L 5/00
[52] U.S. Cl. ................................................................ 15/323
[58] Field of Search ................................................. 15/323

[56] References Cited

U.S. PATENT DOCUMENTS

| | | |
|---|---|---|
| D. 169,336 | 4/1953 | Reece ................... 15/323 |
| 1,759,881 | 5/1930 | Bentley . |
| 2,167,786 | 8/1939 | Taylor . |
| 2,779,432 | 1/1957 | Meyerhoefer ........... 15/323 |
| 2,876,484 | 3/1959 | Wells ..................... 15/323 |
| 3,320,727 | 5/1967 | Farley et al. . |
| 3,870,486 | 3/1975 | Eriksson et al. . |
| 3,877,902 | 4/1975 | Eriksson et al. . |
| 5,077,862 | 1/1992 | Rench . |
| 5,086,539 | 2/1992 | Rench . |

*Primary Examiner*—Diana Biefeld
*Attorney, Agent, or Firm*—Jansson, Shupe, Bridge & Munger, Ltd.

[57] ABSTRACT

A new platform (sometimes referred to as a "caddy") for transporting a carpet cleaning machine includes a base for supporting the machine and a machine restraint mechanism for releasably coupling the machine and the platform to one another. The platform also has wheels (or an elongated roller-like wheel) mounted with respect to the base for rolling the base and the machine across a surface. The restraint mechanism has features preventing relative platform-machine movement along a single axis or, when the mechanism includes pairs of two different types of restraining members, along plural axes. A new method is used for transporting a carpet cleaning machine of the type having a carpet brushing apparatus and a brush drive motor. The method includes the steps of providing a transport platform having a base, energizing the brush drive motor and tipping the machine to transfer more weight onto a brush. Such weight transfer causes the apparatus to urge the machine onto the platform. The machine and the platform are then coupled to one another using one or more restraint mechanisms.

18 Claims, 10 Drawing Sheets

TRANSPORT PLATFORM AND RELATED CARPET CLEANING MACHINE

FIELD OF THE INVENTION

This invention relates generally to cleaning and brushing and, more particularly, to carpet cleaning using a machine having a powered carpet cleaning member.

BACKGROUND OF THE INVENTION

Carpet cleaning machines (including machines for vacuuming carpets) have been in use for decades and over that time, have undergone dramatic improvement. One need only compare U.S. Pat. No. 2,167,786 (Taylor) and U.S. Pat. No. 5,086,539 (Rench) to appreciate the magnitude of such improvement.

A type of "dual-scrubbing" carpet cleaning machine is disclosed in U.S. Pat. Nos. 2,842,788 (Rench et al.) and 2,961,673 (Rench et al.). The machines shown in the Rench et al. patents have no vacuum capability and are used only to stroke a carpet cleaning substance along and across carpet fibers. The dirty material is later removed using a conventional vacuum machine. Improvements in the Rench et al. machines are shown in, e.g., U.S. Pat. Nos. 5,077,863 (Rench) and 5,086,539 (Rench).

The aforementioned patents (particularly the Rench et al. and Rench patents) disclose highly-useful carpet cleaning machines which have found particular favor with professional cleaners who clean carpet on a contract basis in homes, hospitals, airports, office buildings and the like. The machines disclosed in such patents do not address a difficulty experienced by professional carpet cleaners when using such machines, i.e., transportability.

Most professional cleaners load their machines to and from a van or pickup truck at least daily as they move from job site to job site. And in many commercial and institutional buildings, it is required to move the machine from floor to floor as the building carpet is being cleaned. Sometimes there is no elevator and the machine is required to be "man-handled" up and down stairways.

The prior art is not entirely devoid of apparatus used to transport cleaning machines. For example, U.S. Pat. Nos. 3,320,727 (Farley et al.) and 3,877,902 (Eriksson et al.) disclose "cart-like" arrangements used to transport such a machine. But the wheels, frame and the like are an integral part of the cleaning machine and are indispensable to the use of such machine for cleaning as well as for moving it from place to place.

A platform which may be used to transport a carpet cleaning machine along a floor and up and down stairways and work van loading ramps, which is detached from the machine when the machine is in use and which is optionally configured to carry equipment ancillary to carpet cleaning would be an important advance in the art.

OBJECTS OF THE INVENTION

It is an object of the invention to provide a platform for transporting a carpet cleaning machine which overcomes some of the problems and shortcomings of the prior art.

Another object of the invention to provide a transport platform which permits the platform and machine therewith to be readily moved over curbs and up and down stairways.

Yet another object of the invention to provide a transport platform which may be configured to carry equipment, e.g., hoses, nozzles, liquid and particulate carpet cleaning products, ancillary to the carpet cleaning task.

Another object of the invention to provide a transport platform configured in view of a related machine to restrain relative platform-machine movement when the platform and the machine are secured to one another.

Another object of the invention to provide a transport platform configured to substantially avoid bending or crushing the brush of a carpet cleaning machine mounted thereon.

Still another object of the invention is to provide a combination of transport platform and carpet cleaning machine in which the platform and machine are cooperatively configured for securing the platform and machine to one another.

Another object of the invention is to provide a combination of transport platform and carpet cleaning machine which uses platform wheels, the machine and the machine handle as an "integrated" structure for easily moving the machine.

Another object of the invention is to provide a transport platform which may be readily attached to and removed from a carpet cleaning machine.

Yet another object of the invention is to provide a new method for transporting a carpet cleaning machine.

Another object of the invention is to provide a new method for transporting a carpet cleaning machine wherein the method uses machine power to mount the machine to and remove the machine from the platform. How these and other objects are accomplished will become apparent from the following descriptions and from the drawings.

SUMMARY OF THE INVENTION

The new platform for transporting a carpet cleaning machine includes a base for supporting the machine, a machine restraint mechanism for releasably coupling the machine and the platform to one another and at least one wheel mounted with respect to the base for rolling the base and the machine across a surface. While a highly preferred embodiment includes two wheels on the same axis of rotation, the invention contemplates that a single, elongate roller-type wheel may also be used.

The restraint mechanism includes a machine-mounted restraining member for engaging a platform-mounted restraining member. Such mechanism substantially prevents movement of the machine away from the base.

In a more specific embodiment, the platform-mounted restraining member is a projection such as an elongate tongue and the machine-mounted restraining member is a projection-receiving cavity such as an elongate groove sized and shaped to receive the tongue with slight clearance. The projection and cavity separate and engage when the platform and machine are relatively-moved along a first axis. And the projection and cavity lock to one another when the platform and machine are relatively-urged along a second axis. In a highly preferred embodiment, the platform and machine are configured so that the first axis is horizontal and the second axis is angular to the first and, most specifically, is generally perpendicular to the first.

In another embodiment, one of the restraining members (preferably the platform-mounted member) is a pin mounted for reciprocal movement and the other restraining member is a socket for receiving the pin. Most preferably, there are first and second platform-mounted restraining members, namely, the projection and the pin. And there are first and second machine-mounted restraining members, i.e., the cavity and the socket. Using two restraining mechanisms (involving two platform-mounted restraining members and two machine-mounted restraining members) helps assure that the machine and the platform resist relative movement along any axis. In this specification, one of the restraining mechanisms is referred to as a first mechanism and involves the tongue and groove and the other is referred to as a second mechanism and involves the pin and socket.

In another aspect of the invention, the platform includes a structure mounted with respect to the base for carrying equipment ancillary to carpet cleaning. Such equipment may include hoses, hose extensions, nozzles, liquid and particulate carpet cleaning products—and even the machine-user's lunch.

The structure includes a rigid support device such as an exemplary inverted U-bar extending upwardly away from the base. A container is mounted with respect to the support device and has at least one pocket for carrying equipment. While a rigid or flexible container could be used, the container of a highly preferred embodiment includes a flexible body panel having surfaces which are exterior and interior when the container is mounted to the support device. The pocket is on the exterior surface and the container includes a sleeve on the interior surface for slidably receiving the support device. The platform is thereby configured so that the container may be easily removed from and attached to the support device.

In another aspect of the invention, the platform is configured for use with carpet cleaning machines having a brush (as most do) and helps protect such brush. The platform base includes a brush contact surface and at least one chock extending above the surface for supporting a significant part or substantially all of the weight of the machine. The chock extends above the base surface by a dimension sufficient to prevent bending (or at least to prevent significant bending, i.e., bending of a degree leading to more-or-less permanent deformation, of the brush bristles.

In a highly preferred embodiment, the platform includes a pair of chocks for supporting machine weight. Such chocks are spaced from one another and each of the chocks has a terminus. The machine brush has a length and the spacing between the terminii is greater than the length of the brush. So configured, the brush fits between the chocks and lateral surfaces of the machine housing rest atop the chocks.

Another aspect of the invention involves a new method for transporting a carpet cleaning machine having a carpet brushing apparatus (i.e., one or more powered brushes) and a brush drive motor. The method contemplates a cleaning machine, the brush (or a brush) of which rotates in a direction to help propel the machine onto the platform. The method includes the steps of energizing the drive motor, tipping the machine to cause the apparatus to urge the machine onto the platform and coupling the machine and the platform to one another.

Preferably, the method is practiced using a machine having two machine-supporting brushes counter-revolving in a direction such that the brush bristles adjacent to the center of the machine shroud move upwardly and those adjacent to the front and rear edges of the machine move downwardly. The machine is tipped to transfer more than 50% of the machine weight onto the brush closer to the platform and such brush thereby propels the machine onto the platform with little or no effort by the user.

In a more specific aspect of the method, the coupling step includes urging the machine onto the platform to a position engaging a first restraint mechanism and, even more specifically, also engaging a second restraint mechanism. Where the platform includes one or two chocks for supporting machine weight, the tipping step is followed by the step of urging the machine atop the chock or chocks, as the case may be. The machine may be urged atop the chocks by the "driving" brush or by lifting the machine slightly with respect to the platform.

This specification refers to "dirty material." Such phrase means dust, liquid, dirt-entraining particulate matter or any other substance foreign to new carpet. Other details of the invention are set forth in the following detailed description and in the drawings.

BRIEF DESCRIPTION OF THE DRAWINGS

FIG. 12 is a view taken along the viewing plane 12—12 of FIG. 5.

DETAILED DESCRIPTION OF THE PREFERRED EMBODIMENTS

Figure 1:
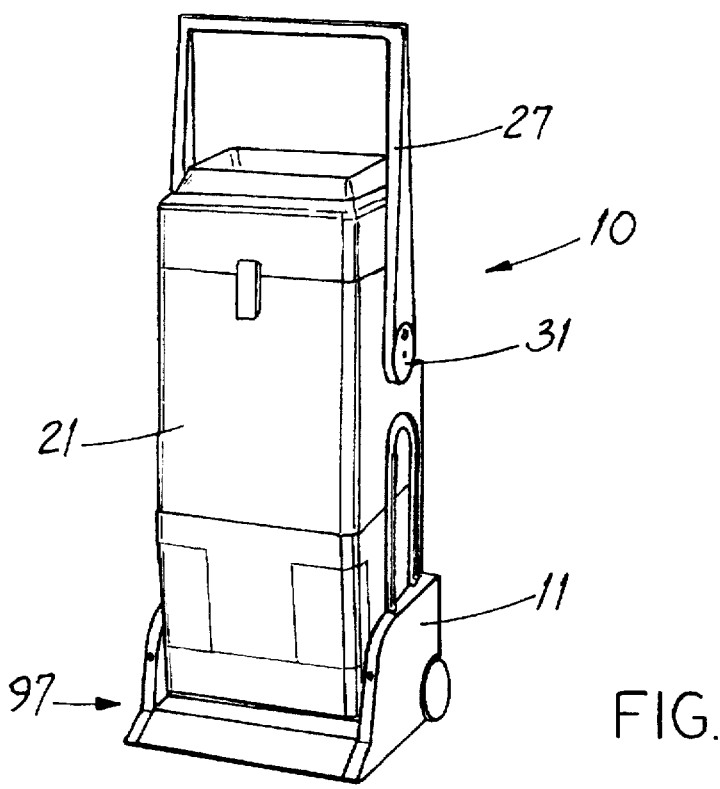
FIG. 1 is a perspective view of the carpet cleaning machine mounted in a transport platform.

The first part of this detailed description provides an overview explanation of the general arrangement of a new carpet cleaning machine 10 which "builds on" and represents a dramatic improvement over the machines shown in U.S. Pat. Nos. 2,842,788 (Rench et al.) and 2,961,673 (Rench et al.) noted above. As will become apparent, the new machine 10 has great utility as a vacuum machine for removing dirty material from carpet and also as a carpet "scrubbing" machine for cleaning carpet fibers. This is followed by a detailed explanation of a new transport platform 11 which is particularly useful in moving the machine 10 from place to place.

Next, the detailed description explains new features of the machine 10 which improve the way the machine removes dirty material from the air stream passing through it. Finally, the description sets out details of machine features which help reduce maintenance time, i.e., increase machine "up-time" or time available for productive work.

OVERVIEW

Referring first to FIGS. 1, 2, 3, 4 and 5 the new machine 10 has a lower shroud 13 covering a pair of motor-driven, cylinder-shaped, counter-revolving carpet cleaning members 15, 17. The members 15, 17 rotate in the directions represented by the arrows 19 in FIG. 5 and when the machine 10 is in use, such members 15, 17 entirely support the weight of the machine 10. (In FIG. 3, member 15 is embodied as a brush. The invention also contemplates members 15, 17 embodied as pads, rollers or the like.)

Above and rigidly coupled to the shroud 13 is a housing 21 which contains a vacuum motor 23 separately-controlled from the electric motor 35 driving the members 15, 17. The housing 21 also confines a system 25 for removing dirty material extracted from carpet 26 being cleaned and entrained in the air stream passing through the machine 10.

Figure 2:
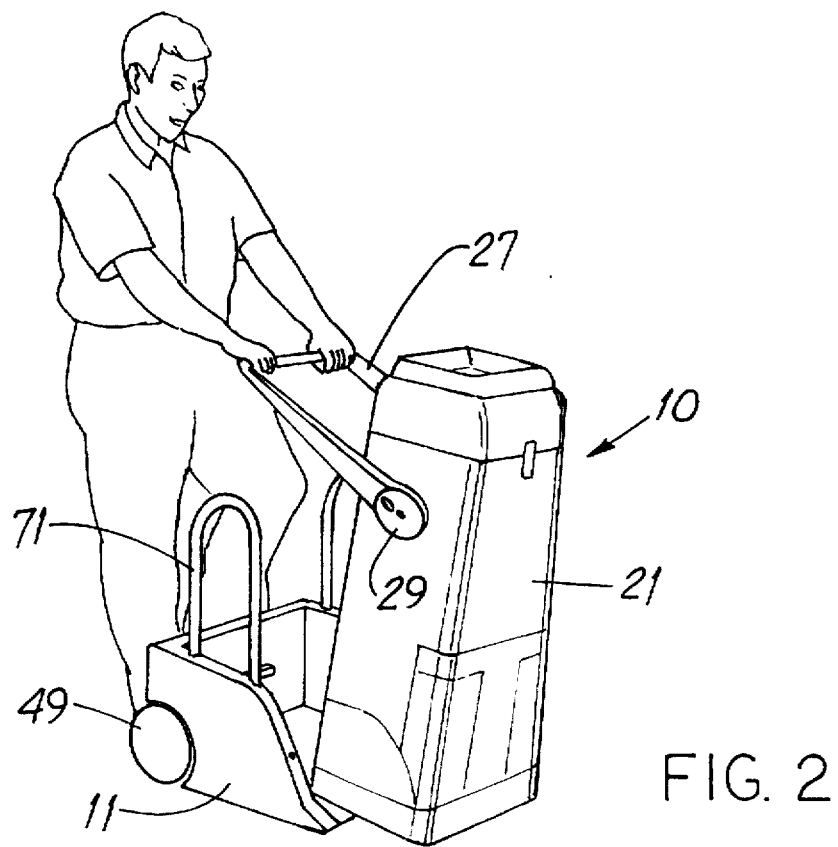
FIG. 2 is a perspective view representing how the machine is "driven" onto the platform shown in FIG. 1.

Considering FIGS. 1 and 2, an arched or "bail-type" handle 27 is pivotably coupled to the housing 21 at first and second pivot mounts 29 and 31, respectively. The handle 27 can be secured in any of several positions for cleaning carpet or moving the machine 10 and has other "free" positions described below.

Figure 3:
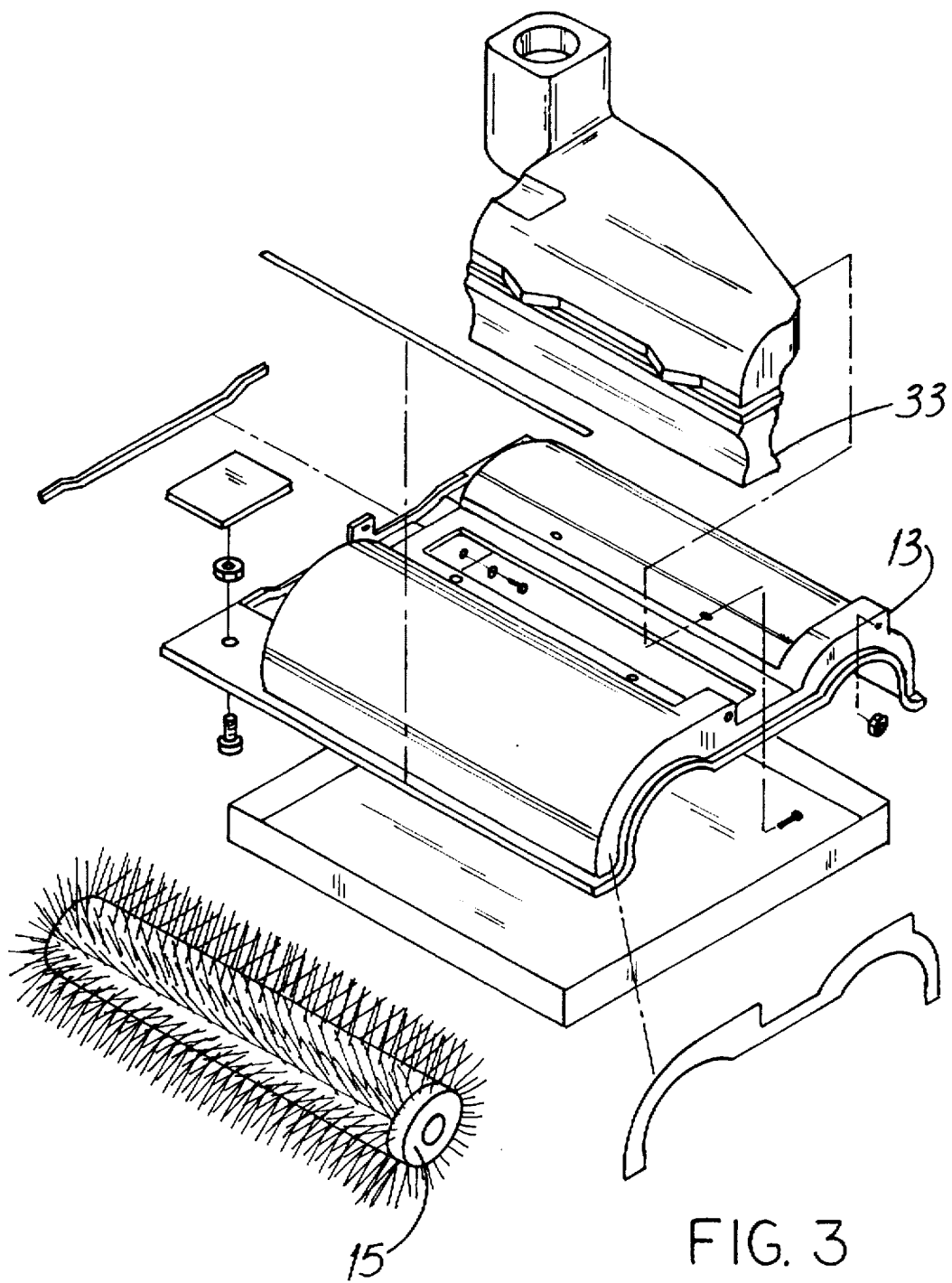
FIG. 3 is an exploded view of components of the machine.
Figure 5:
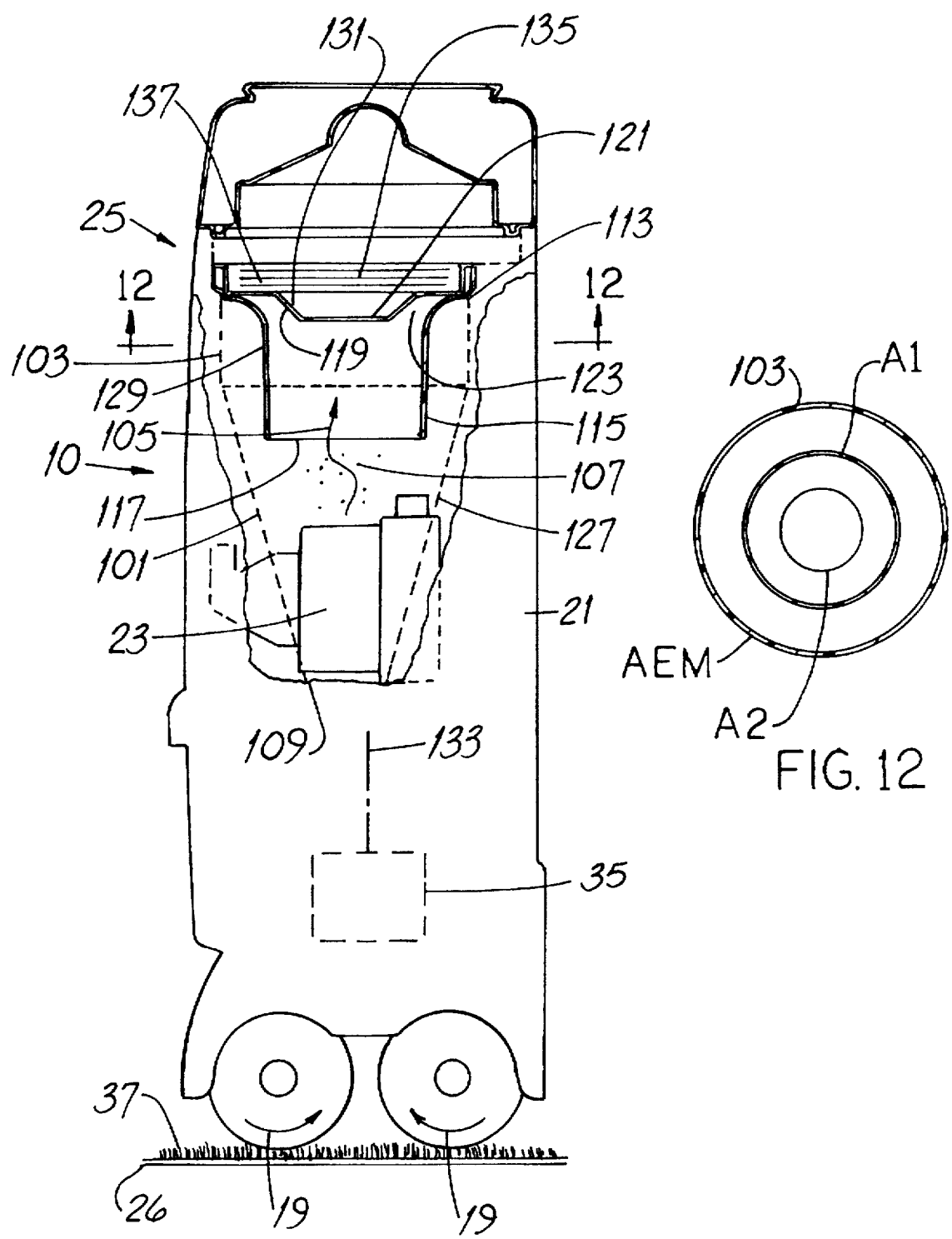
FIG. 5 is a side elevation view of the machine with parts broken away to show the air cleaning system.
Figure 6:
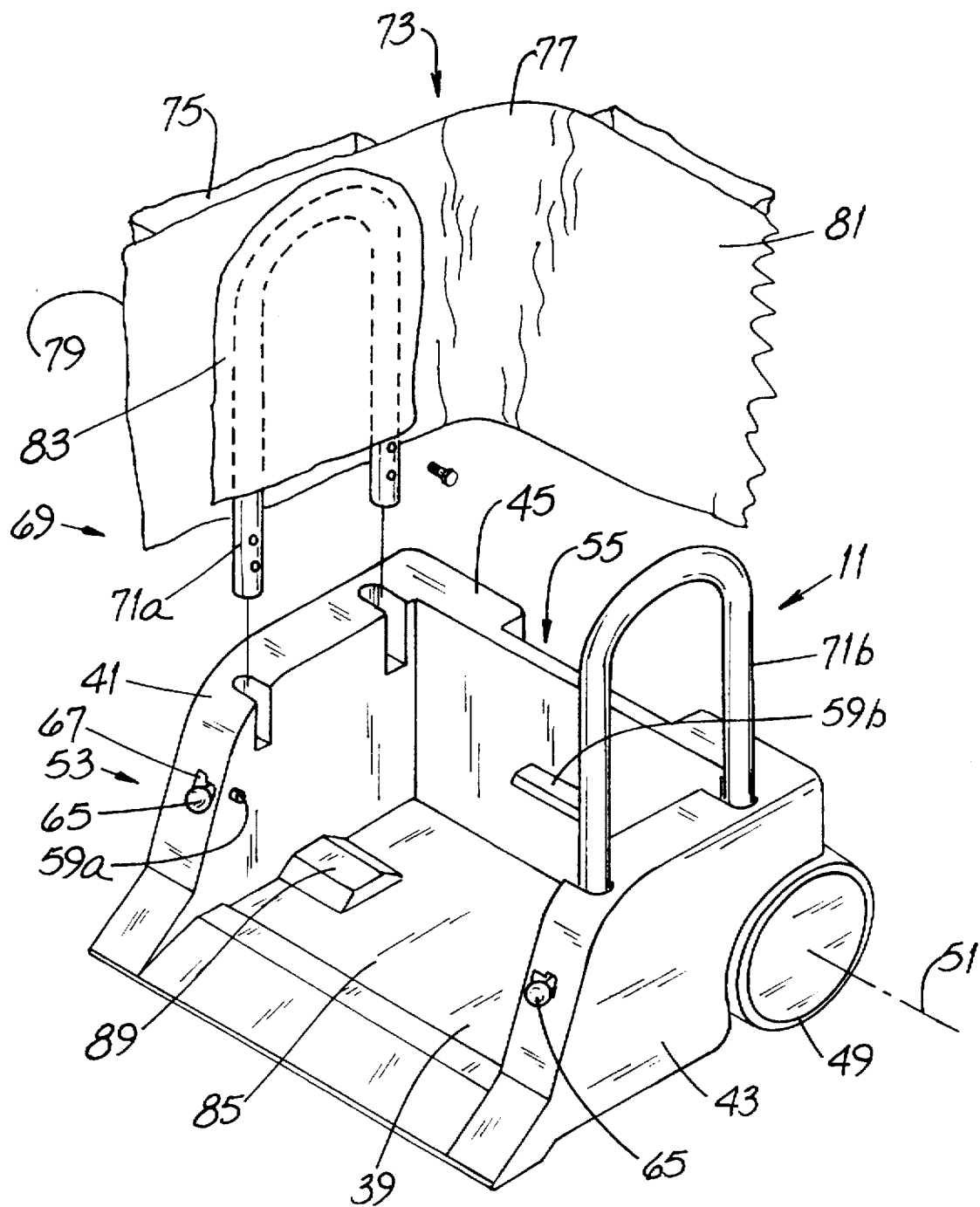
FIG. 6 is a perspective view, partially exploded, of the machine transport platform.
Figure 13:
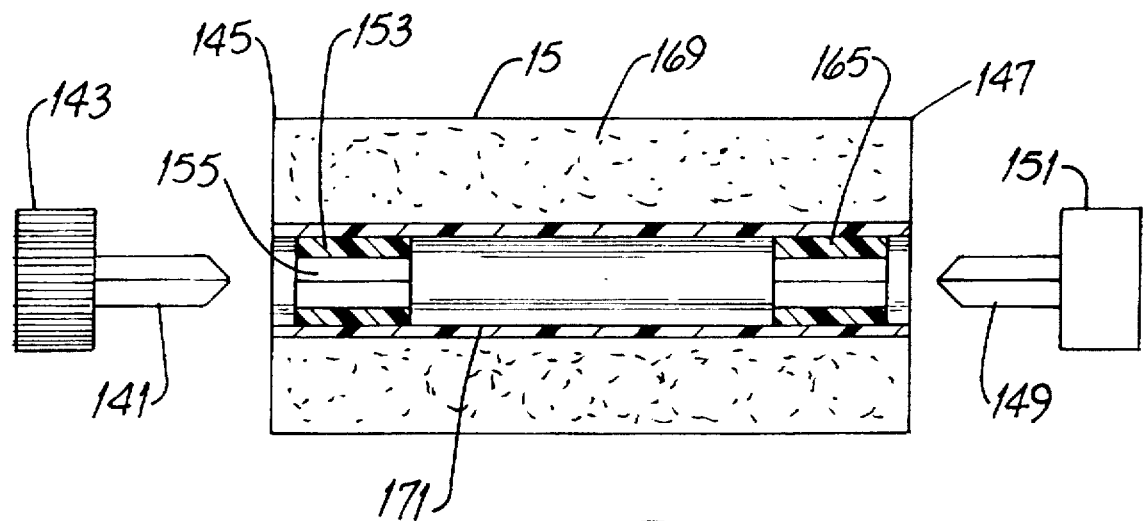
FIG. 13 is a cross-sectional view of a carpet cleaning member shown with drive and idler shafts in full representation.
Figure 14:
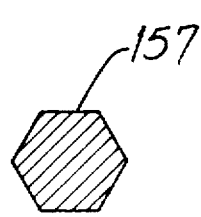
FIG. 14 is a sectional view of a hexagon torque-transmitting shape.
Figure 15:
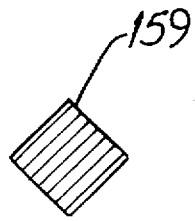
FIG. 15 is a sectional view of a square torque-transmitting shape.
Figure 16:
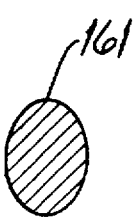
FIG. 16 is a sectional view of an oval torque-transmitting shape.
Figure 17:
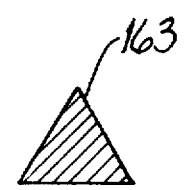
FIG. 17 is a sectional view of a triangular torque-transmitting shape.

The machine 10 may be used in either or both of two ways. As shown in FIGS. 3, 5 and 6, a vacuum nozzle 33 is between the members 15, 17 and picks up dirty material from carpet 26 when both the vacuum motor 23 and cleaning-member drive motor 35 are energized. With the vacuum motor 23 de-energized and only the cleaning-member drive motor 35 energized, the machine 10 may be used to stroke a cleaning substance along and across carpet fibers 37.

The Transport Platform

Details of the new transport platform 11 will now be set forth. Referring to FIGS. 1, 2, 3, 4 and 6–11, the new transport platform 11 includes a base 39 for supporting the machine 10, a pair of side panels 41, 43, and a rear panel 45. The panels 41, 43, 45 are attached to and extend upwardly from the base 39 to form a contiguous structure which partially encloses the shroud 13 and the bottom portion of the housing 21. So configured, the platform 11 permits the machine 10 to "nest" therein for transport.

An axle 47 is below the rear panel 45 and supports separate wheels 49 adjacent to respective side panels 41, 43. While a highly preferred embodiment includes two wheels 49 on the same axis of rotation 51, the invention contemplates that a single, elongate roller-type wheel may also be used although less conveniently—a single roller does not have the counter-rotation capability of two spaced wheels 49.

Figure 4:
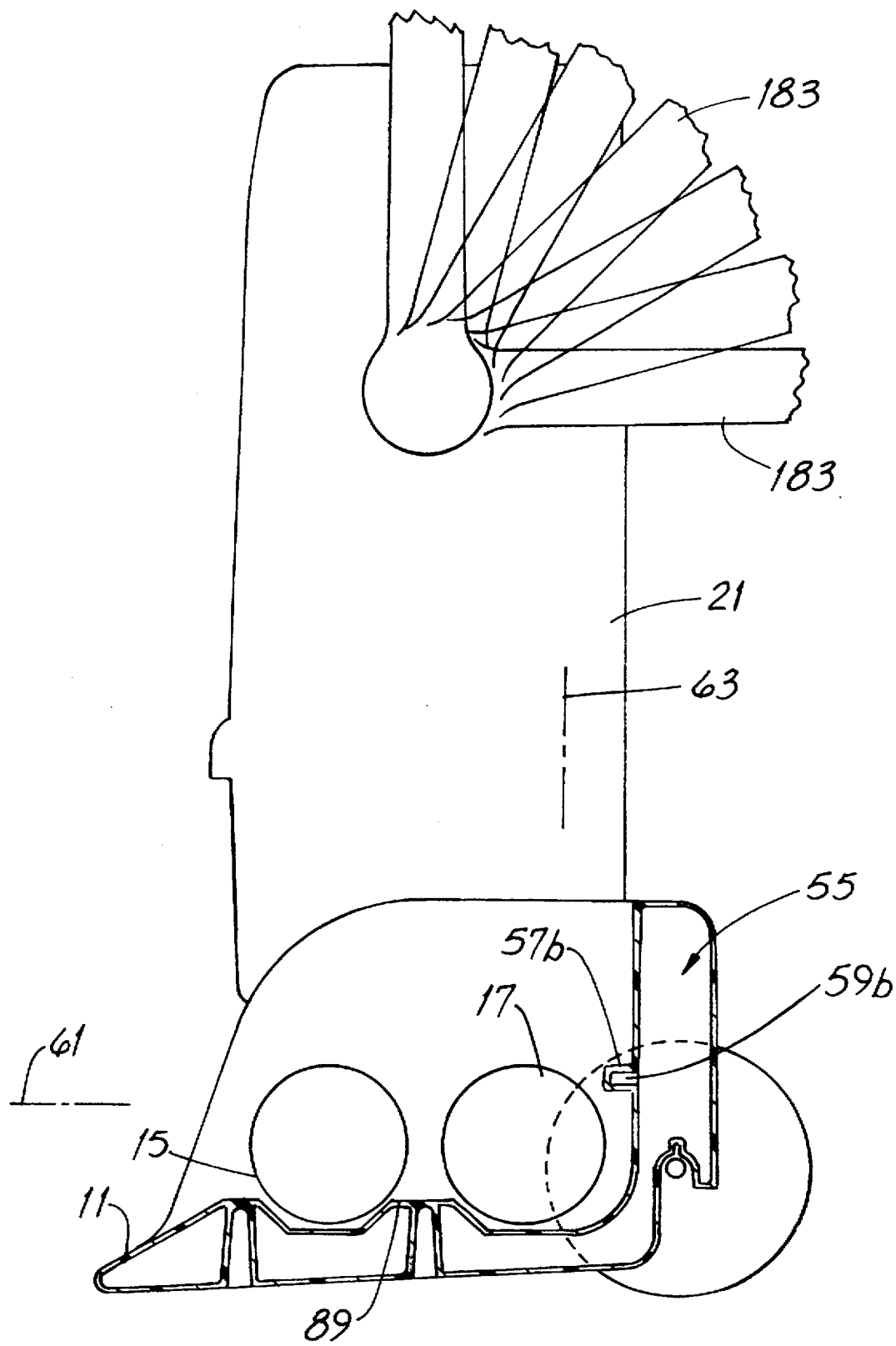
FIG. 4 is a side elevation view, partly in phantom, showing the machine mounted in the transport platform.
Figure 8:
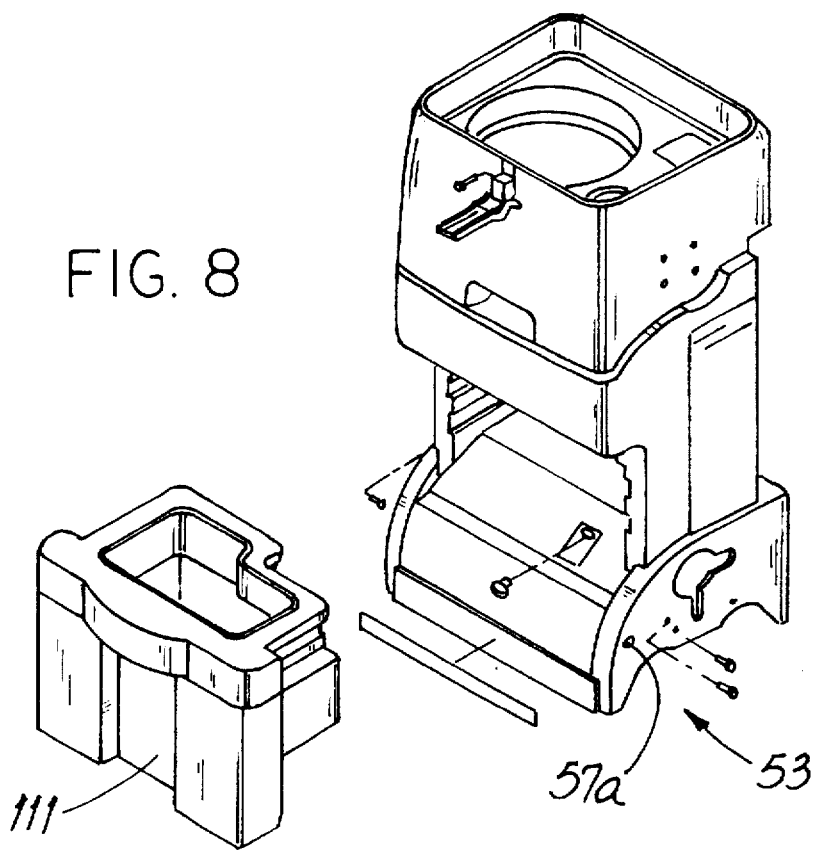
FIG. 8 is a perspective view, partially exploded, showing housing and collection receptacle components of the machine.
Figure 9:
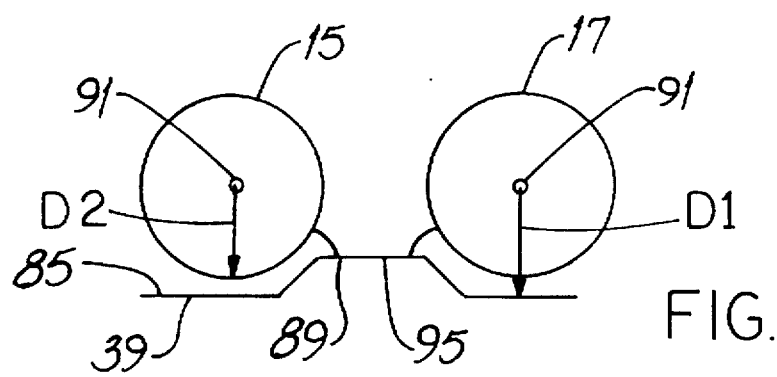
FIG. 9 is a representative side elevation view showing features of the transport platform.

Referring particularly to FIGS. 4, 6 and 8, the arrangement includes a pair of machine restraint mechanisms 53 and 55, respectively, for releasably coupling the machine 10 and the platform 11 to one another. While specific details of each mechanism 53, 55 will be described in turn, the mechanisms 53, 55 share some common aspects.

Each restraint mechanism 53, 55 includes a machine-mounted restraining member 57a, 57b for engaging a platform-mounted restraining member 59a, 59b. Individually, the mechanisms 53, 55 substantially prevent movement of the machine 10 away from the base although as to each mechanism 53 or 55, such motion prevention is with respect to different reference points.

Referring particularly to FIG. 4, in a more specific embodiment, the platform-mounted restraining member 59b is a projection such as a horizontally-disposed, elongate tongue extending inwardly from the rear panel 45 of the platform 11. The machine-mounted restraining member 57b is a projection-receiving cavity such as a horizontally-disposed, elongate groove sized and shaped to receive the tongue with slight clearance. The projection and cavity separate and engage when the platform 11 and machine 10 are relatively-moved along a first axis 61. And the projection and cavity lock to one another when the platform 11 and machine 10 are relatively-urged along a second axis 63. In a highly preferred embodiment, the platform 11 and machine 10 are configured so that when the machine 10 is standing upright in the platform 11, the first axis 61 is horizontal and the second axis 63 is angular to the first axis 61 and, most specifically, is generally perpendicular to such first axis 61.

Referring particularly to FIGS. 6 and 8, in the restraining mechanism 53, the restraining member 59a includes a projection such as a pin mounted for reciprocal movement and the other restraining member 57a is a socket for receiving the pin. In the illustrated embodiment, the pin is on a lever 65 movable horizontally in a slot 67 for urging the pin into and out of engagement with the socket on the side of the machine 10.

From the foregoing, it is apparent that either one of the restraint mechanisms 53, 55 helps restrain the platform 11 and machine 10 from moving away from one another. However, the preferred arrangement uses both mechanisms 53, 55 for quick, secure platform-machine locking and unlocking.

Referring particularly to FIGS. 2 and 6, the platform 11 includes a notable convenience feature. The platform 11 has a structure 69 mounted with respect to the base 39 for carrying equipment ancillary to carpet cleaning. Such equipment may include hoses, hose extensions, nozzles, liquid and particulate carpet cleaning products—and even the machine-user's lunch.

The structure 69 includes a rigid support device 71 such as an exemplary inverted U-bar 71a extending upwardly away from the base 39 and, particularly, upwardly from a side panel 41 or 43. In a highly preferred arrangement, there is a second inverted U-bar 71b extending upwardly from a side panel 43 or 41.

A container 73 is mounted with respect to the support device 71 and has at least one pocket 75 (and preferably several pockets 75) for carrying equipment. While a rigid or flexible container 73 could be used, the container 73 of a highly preferred embodiment includes a flexible body panel 77 having surfaces 79, 81 which are exterior and interior, respectively, when the container 73 is mounted to the support device 71. The pocket 75 is on the exterior surface 79 and the container 73 includes a sleeve 83 on the interior surface 81 for slidably engaging the support device 71. The platform 11 is thereby configured so that the container 73 may be easily attached to and removed from the support device 71 by slipping the sleeves 83 over respective support devices 71. This arrangement helps "carry the closet" (of cleaning compounds, nozzles and the like) with the machine 10. (A preferred embodiment contemplates a pair of side-mounted containers 73, one container 73 "sleeved" over each device 71a, 71b. And, of course, a single container 73 on one device 71a or 71b or a wrap-around container 73 supported by both devices 71a, 71b may be used.)

In another aspect of the invention, the platform 11 is configured to prevent the cleaning members 15, 17 from becoming flattened or "taking a set" which might impair the cylindrical shape of such members 15, 17 and which may impair their performance in cleaning carpets 26. Referring to FIGS. 4, 6, 9 and 10, the platform base 39 includes a surface 85 and at least one chock 89 extending above the surface 85 for supporting a significant part or substantially all of the weight of the machine 10. The chock 89 extends above the base surface 85 by a dimension selected so that when the machine 10 is resting on the chocks 89 (there is a chock 89 adjacent to and extending inwardly from each side panel 41, 43), the distance D1 from the axis of rotation to the surface 85 is slightly greater than the distance D2 from the axis of rotation 91 to the outer perimeter of the member 15, 17.

Figure 10:
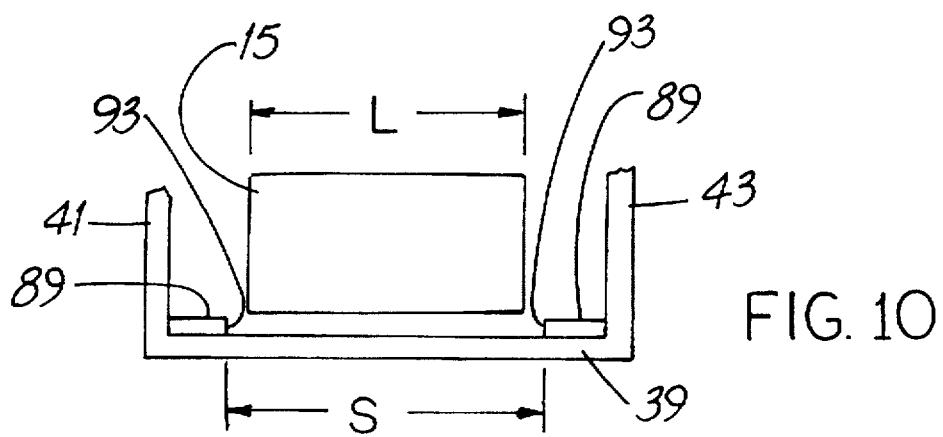
FIG. 10 is a representative front elevation view showing features of the transport platform.
Figure 11:
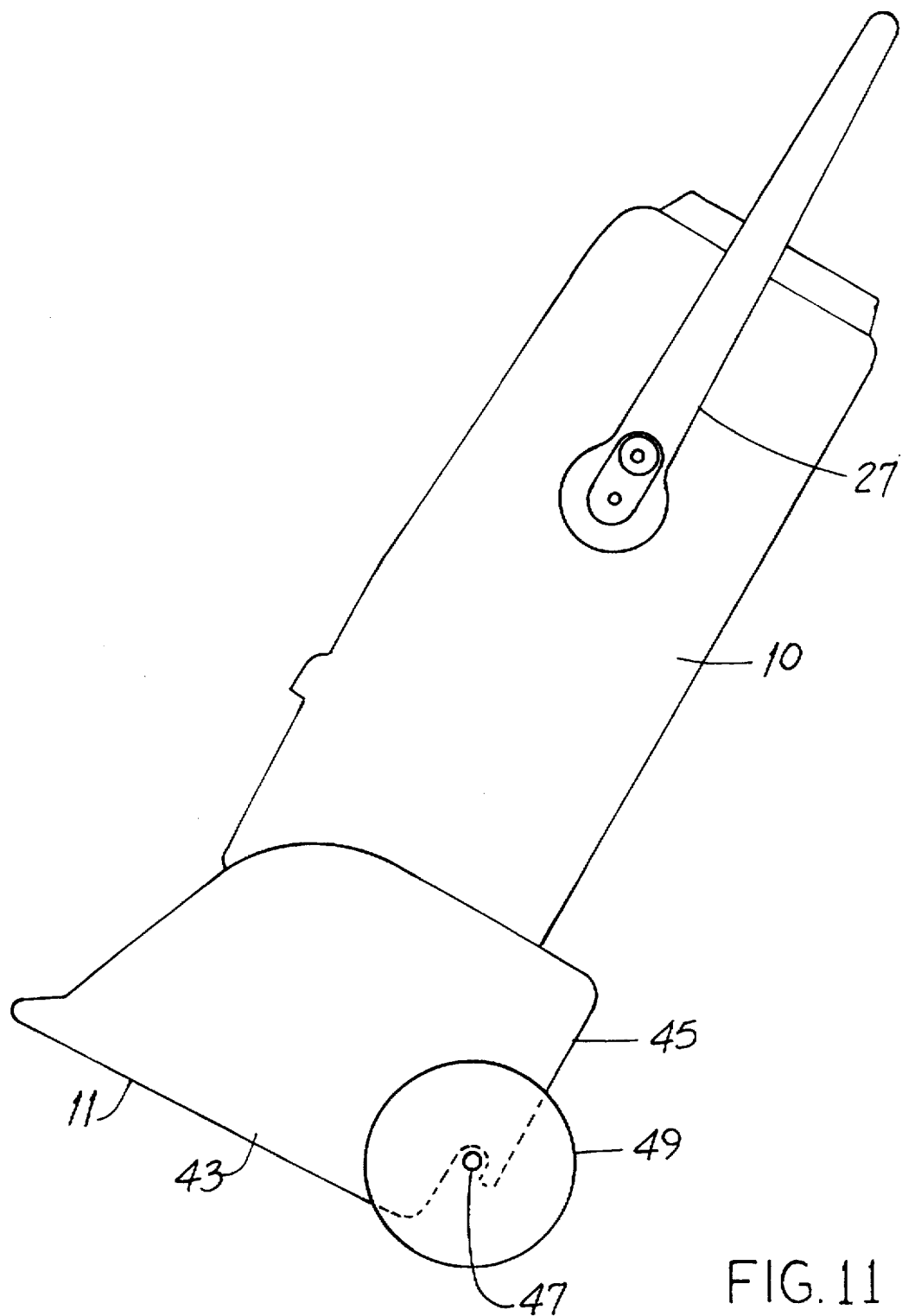
FIG. 11 is a representative side elevation view showing the machine and its transport platform in a machine-transporting configuration and orientation.
Figure 18:
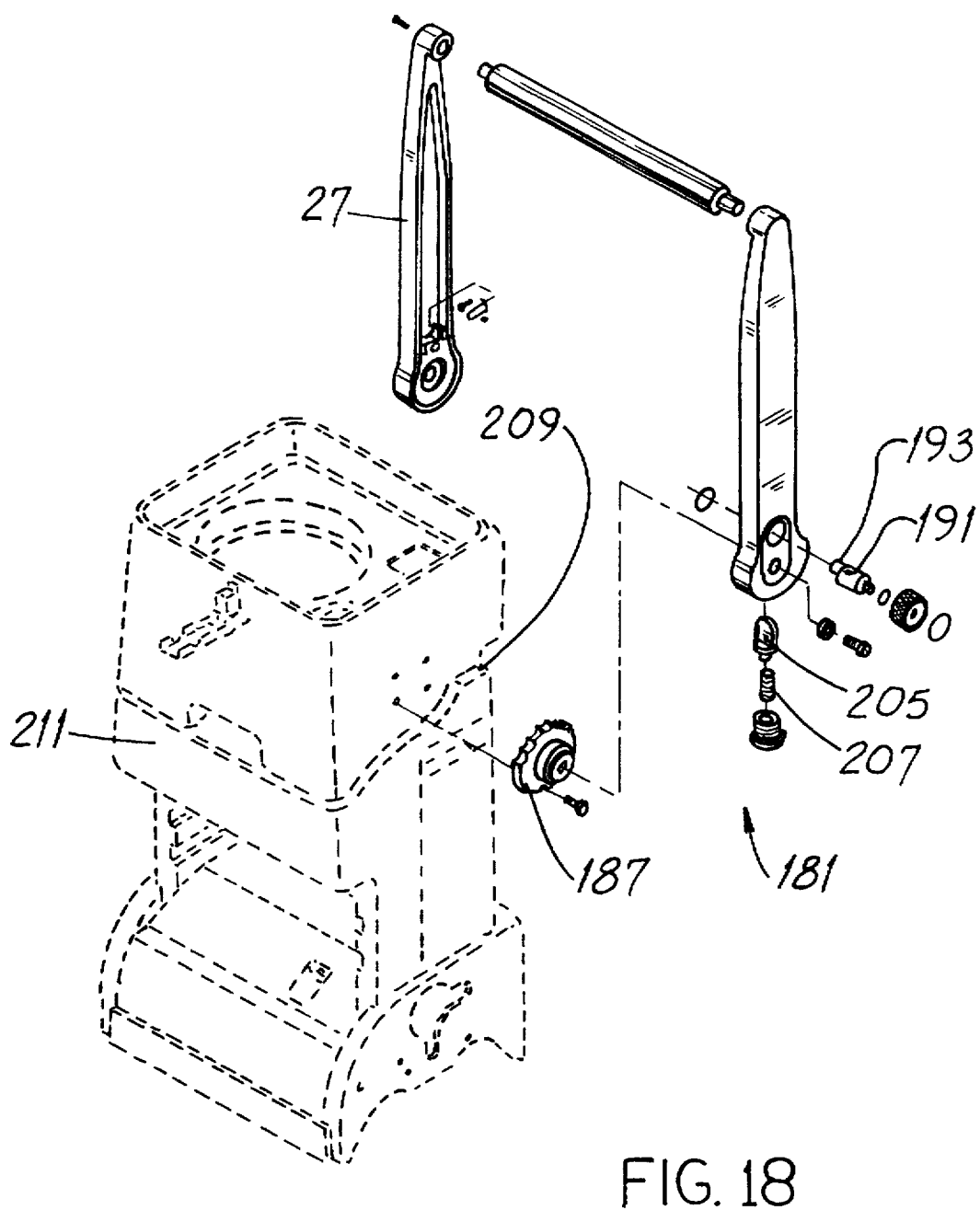
FIG. 18 is an exploded view, partially in phantom, showing the machine handle and handle stop mechanism.

Referring particularly to FIGS. 6 and 10, the chocks 89 are horizontally spaced from one another and each of the chocks 89 has a terminus 93. The machine carpet cleaning member 15, 17 has a length L and the spacing S between the terminii 93 is greater than the length L of the member 15, 17. So configured, the member 15, 17 fits between the chocks 89 and lateral surfaces of the machine 10 rest atop the chocks 89.

Another aspect of the invention involves a new method for transporting a carpet cleaning machine 10 having a carpet cleaning member 15, 17 (i.e., one or more powered rollers, pads, brushes or the like) and a motor 35 for rotatably driving the member 17. The method contemplates a cleaning machine 10, the member 17 (or a member 15, 17) of which rotates in a direction to help propel the machine 10 onto the platform 11.

The method includes the steps of energizing the drive motor 35, tipping the machine 10 as shown in FIG. 2 to cause the member 17 to urge the machine 10 onto the platform 11 and coupling the machine 10 and the platform 11 to one another. Preferably, the method is practiced using a machine 10 having two carpet cleaning members 15, 17 counter-revolving in directions as shown in FIG. 5. In that way, the members 15, 17 may be used for powering the machine 10 off of the platform 11 as well as onto such platform 11 as described above.

When placing the machine 10 on the platform 11, the machine 10 is tipped to transfer machine weight onto the member closer to the platform 11, i.e., member 17 in FIG. 4, so that more than 50% of the machine weight is thereby on such member 17. The member 17 thereupon propels the machine 10 onto the platform with little or no effort by the user. To "drive" the machine 10 from the platform 11, the machine 10 is tipped to transfer machine weight onto that member 15 nearer the front opening 97.

In a more specific aspect of the method, the coupling step includes urging the machine 10 onto the platform 11 to a position engaging a first restraint mechanism 53 and, even more specifically, also engaging a second restraint mechanism 55. Where the platform 11 includes one or two chocks 89 for supporting machine weight, the tipping step is followed by the step of urging the machine 10 atop the chocks 89. The machine 10 may be urged atop the chocks 89 by the "driving" member 17 (while tipping the machine 10 as described above) or by lifting the machine 10 slightly with respect to the platform 11.

System for Removing Dirty Material from Machine Air Stream

Referring next to FIGS. 3, 5, 7, 8 and 12, the machine 10 has an air stream cleaning system 25 confined in the housing 21. Such system 25 includes a centrifugal separator 101 having an air entry port into which an air stream is tangentially introduced into the separator neck portion 103. The air stream 105 (made possible, of course, by the vacuum motor 23) originates at the vacuum nozzle 33 and has dirty material 107 entrained in it. Such material 107 is removed from the carpet 26 during cleaning.

The air stream 105 spirals downwardly along the cone-shaped portion and a portion of the dirty material 107 entrained in such air stream 105 (especially more dense material 107) is thrown outwardly by centrifugal force and falls through the cone end to a receptacle 111 below. The air stream 105 then flows upwardly toward the separator exit mouth 113 toward other filter media which may be included in the system 25 and toward the air exhaust port.

A first air flow guide 115 is fixed with respect to the mouth 113 and includes a first "flow-through" aperture 117 having a first area A1 as represented by the area circumscribed by the circle A1. A second air flow guide 119 is fixed with respect to the first guide 115 and includes a second flow-through aperture 121 having a second area A2 (circumscribed by the circle A2) which is less than the first area A1. Thus, air entraining dirty material 107 and leaving the separator 101 must pass through two apertures 117 and 121 having respective areas A1, A2 which are progressively smaller than the area AEM of the separator exit mouth 113, such area AEM being that area circumscribed by the circle AEM.

The two flow guides 115, 119 are preferably configured as a one-piece structure and define a slot-like cavity 123 between them. The air stream moves through the first guide 115 in a first direction as represented by the arrow 105, i.e., away from the cone-end 109 of the cyclone separator 101 and toward an exit opening. The cavity 123 converges in the same direction and captures dirty material 107 which is removed from a carpet 26 and passes through the first aperture 117. The cavity 123 thereby prevents such material 107 from entering and passing through the second aperture 121.

Other aspects of the invention involve positional relationships of parts. The separator 101 includes the above-noted cone-shaped portion 127 and the generally-cylindrical neck portion 103 above such portion 127 and terminated by the mouth 113. The first and second guides 115 and 119, respectively, include first and second guide portions 129 and 131, respectively, which extend into the neck portion 103.

The separator 101 and the guides 115, 119 are coincident with a central axis 133 and in a very specific embodiment, the separator 101 and apertures 117, 121 are circular and concentric with such axis 133. The guide portions 129, 131 "transition" inwardly toward the axis 133 and in a second direction, i.e., toward the cone-shaped portion 127 of the separator 101.

And while it is feasible to mount a mesh-type filter medium away from the guides 115, 119, in a highly preferred embodiment, there is a pocket 135 fixed with respect to the guides 115 and 119, most preferably, formed in the second guide 119. One or, preferably, two lift-out filters are conveniently placed in the pocket 135.

(It is apparent from the foregoing that the separator 101, filters 137 and any other filters subsequent to the filters 137 are arranged in what may be described as "air flow series." That is, air from the vacuum nozzle 33 flows first through the separator 101, then through the guides 115, 119 and filters 137 and then through any other filter and to the machine exhaust port.)

A new method for removing dirty material 107 from air flowing through a centrifugal separator 101 includes the steps of providing first and second flow guides 115, 119 fixed with respect to the separator 101 and having a cavity 123 between them. Air-entrained dirty material 107 flows into the separator 101 and a portion of the dirty material 107 is captured in the cavity 123. Such material 107 is later released to fall downwardly through the separator 101 to the slide-out collection receptacle 111 shown in FIG. 8. The flowing step includes energizing a vacuum motor 23 and the releasing step includes de-energizing such motor 23.

While the arrangement is considered to be operative for all types of dirty material 107, it is particularly effective with particulate material such as HOST® dry extraction carpet cleaning granules as made by Racine Industries, Inc. of Racine, Wis., in that such material tends to "pack" in the cavity 123. And of course, dirty material 107 caught in the cavity 123 does not go downstream to clog a mesh filter 137. "Between-cleaning" filter life is significantly extended. When the flow guides 115, 119 are made of a transparent material, the machine user may view the interior of the separator 101 (and whether or not it is clogged in some way) after removing the filter(s) 137 but without removing the guides 115, 119.

Maintenance-Reducing/Productivity-Improving Features

The new machine 10 has a number of features which improve productivity by lengthening the time during maintenance "intervals." Putting it another way, such features increase machine "up-time," i.e., the aggregate time over which the machine 10 is available for carpet cleaning. The above-described arrangement of the air stream cleaning system 25 is but one of such features.

Referring next to FIGS. 5, 7, 9 and 13-17, each revolving carpet cleaning member 15, 17 (brush, roller, pad or the like) is powered by a respective drive shaft 141 driven by a gear 143. Each such cleaning member 15, 17 has first and second ends 145 and 147, respectively. (For this description, only member 15 is shown.) Considering a single cleaning member 15, the drive shaft 141 is coupled to the first end 145 and a non-powered or idler shaft 149 is supported by a bearing 151 and is coupled to the second end 147. Such idler shaft 149 is spaced from the drive shaft 141 and supports the second end 147 for rotation. Powered mounting of a cleaning member 15 in that way avoids tapering problems associated with cantilever mounting.

More specifically, the first end 145 includes a first bushing 153 having an opening 155 configured to a torque-transmitting shape such as a hexagon 157, square 159, oval 161, triangle 163 or the like. The drive shaft 141 is also configured to the torque-transmitting shape for driving engagement with the first bushing 153. (While a shaft 141 having a hexagon cross-sectional shape is shown and preferred, any random or regular geometric shape except a circle will transmit torque from the gear 143 to the member 15.)

Similarly, the second end 147 includes a second bushing 165 coacting with the idler shaft 149 for supporting the second end 147. Most preferably (at least for commonality of bushings 153, 165 and shaft stock), the second bushing 165 and the idler shaft 149 are also respectively configured to the torque-transmitting shape.

In the cleaning member 15, the carpet-contacting portion 169 is supported by a hollow interior tube 171 concentric with the axis of rotation 91 of the cleaning member 15. The drive shaft 141 is coupled to the first bushing 153 and drives the idler shaft 149 through the tube 171 and the second bushing 165.

From the foregoing, it is to be appreciated that the cleaning member 15 is supported at both ends rather than merely being supported "cantilever-fashion" at one end. And the member 15 is symmetrical so that a person replacing a member 15 may do so without taking time to ascertain which end 145, 147 goes on which shaft 141, 149.

Figure 7:
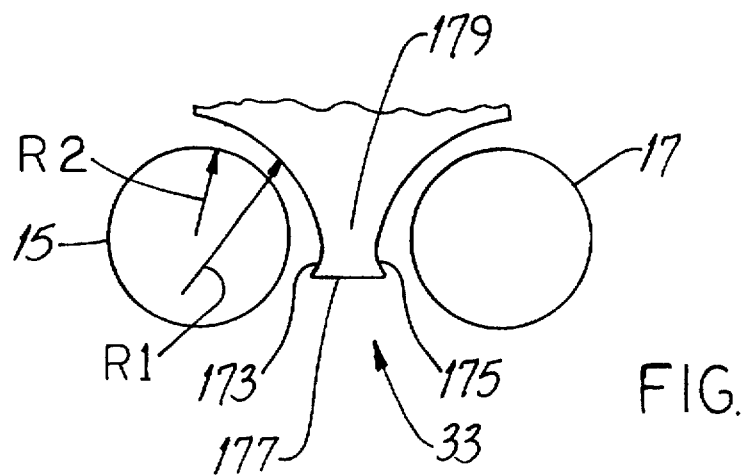
FIG. 7 is a representative side elevation view showing features of the machine vacuum nozzle. Parts are broken away.

Another maintenance-reducing feature is provided in recognition of the propensity of certain types of dirty material to bridge or span across a less-than-optimally configured vacuum nozzle. Referring next to FIGS. 3 and 7, a vacuum nozzle 33 is between the cleaning members 15, 17 and directs the dirty material 107 drawn away from the carpet 26 to the separator 101. In end view (viewed along the axes of rotation 91 of the cleaning members 15, 17), the nozzle 33 is somewhat wedge-shaped and includes a first surface 173 toward the first cleaning member 15 and a second surface 175 toward the second cleaning member 17.

Preferably, the surfaces 173, 175 are curved, i.e., they have a radius of curvature or radii of curvature. Most preferably, the radius of curvature R1 of the first surface 173 is greater than the radius of curvature R2 of the first member 15 so that when viewed from nozzle top to nozzle bottom, most points on a surface 173 of the nozzle 33 becomes progressively farther spaced from its respective cleaning member 15. The nozzle 33 terminates in a flared mouth 177 substantially preventing nozzle clogging.

Immediately above the flared nozzle 33 is a region 179 of reduced cross-sectional area, i.e., a region 179 having an area somewhat less than that of the flared mouth 177. Such region 179 slightly increases the velocity of air flowing therethrough and helps clear dirty material 107 through the nozzle 33.

Figure 19:
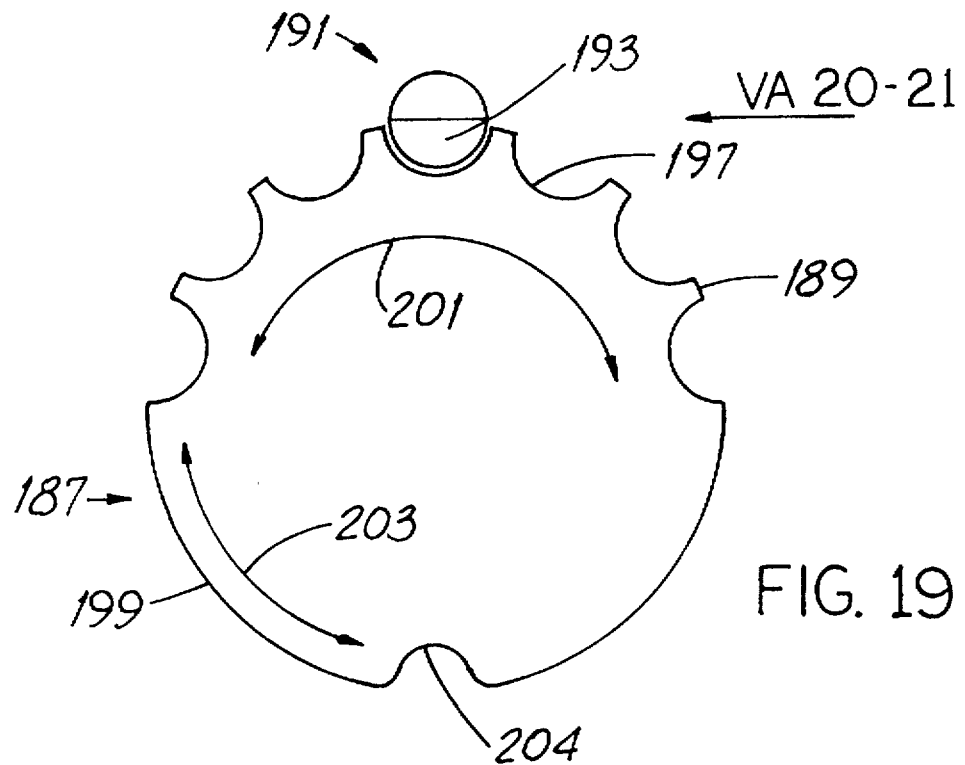
FIG. 19 is an elevation view of components of the handle stop mechanism.
Figure 20:
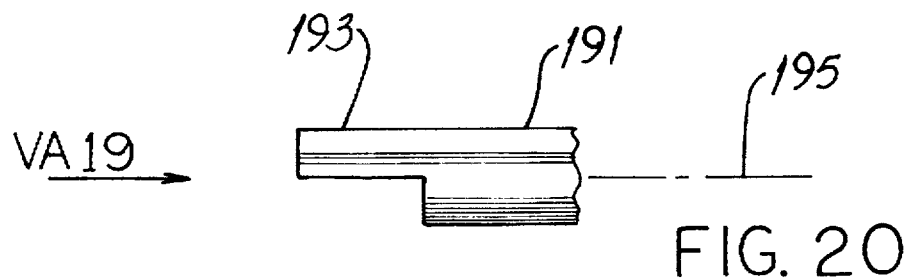
FIG. 20 is a side elevation view of the handle stop member taken along the viewing axis VA20–21 of FIG. 19. Part is broken away.
Figure 21:
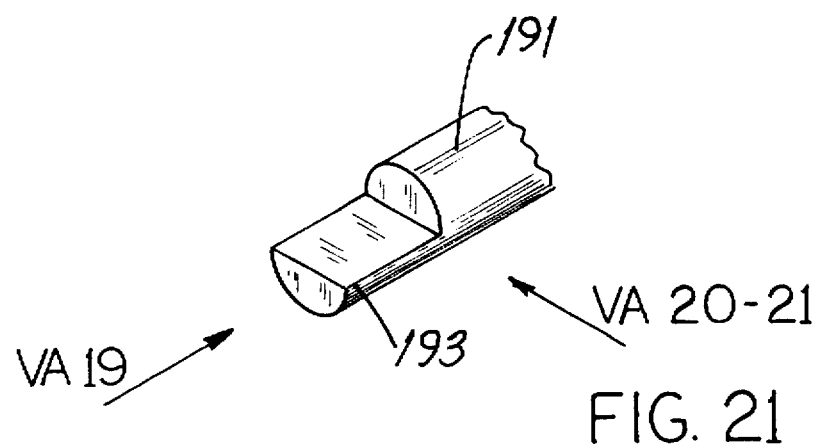
FIG. 21 is a perspective view of the handle stop member of FIGS. 19 and 20. Part is broken away. The stop member generally appears as in FIG. 19 when viewed along the viewing axis VA19 of FIGS. 20 and 21.

And that is not all. Referring also to FIGS. 1, 2, 4, 11 and 18-21, the machine has a handle 27 cooperating with a handle stop mechanism 181 for retaining the handle 27 at any one of several selected positions. The arched handle 27 is coupled to the housing 21 at first and second pivot mounts 29 and 31, respectively, and an adjustable stop mechanism 181 is at the second pivot mount 31 for retaining the handle 27 at any one of several available angular positions as represented by the position "markers" 183 in FIG. 4. The stop mechanism 181 includes a "starwheel-like" plate 187 fixed with respect to the housing 21 and having a plurality of radially-outwardly-directed projections 189. A stop member 191 is mounted for rotation between a first position and a second position and includes a pin 193 eccentric to the stop member center axis 195. The stop member 191 is mounted on the swinging handle 27 and engages a projection 189 when the pin 193 is rotated to the first position as represented by FIGS. 19 and 21. In other words, when the pin 193 is in registry with one of the notches 197 in the plate 187, the handle 27 is locked in a position. And the handle 27 is free to swing when the stop member 191 is rotated so that the pin 193 is spaced from the projections 189 when the pin 193 is at the second position as represented by FIG. 20.

While the stop mechanism 181 permits the handle 27 to be locked at any of several positions, the mechanism 181 is constructed in such a way that the handle 27 cannot be locked in all of its available positions. The mechanism plate 187 is generally circular and has an edge 199 and the projections 189 extend over a first arc 201 along the edge 199. A second arc 203 along the edge 199 is free of projections 189 so that the stop pin 193 is unable to lock the handle 27 in positions where the pin 193 is in registry with the second arc 203. A user is thereby prevented from damaging the machine 10 and/or the handle 27 or mechanism 181 by trying to lift or move the machine 10 while the handle 27 is in one of such positions.

Considering FIGS. 18–21, the handle 27 is locked in position when the stop member 191 is rotated to the position shown in FIGS. 19 and 21. And the handle 27 is free to swing when the stop member 191 is rotated to the position shown in FIG. 20.

And there are other convenience features. The stop mechanism 181 includes a groove 204 and a detent finger 205 which is lightly spring biased toward the groove 204. When the handle 27 is vertical, the finger 205 engages the groove 204 and retains the handle 27 upright. However, the groove 204, finger 205 and spring 207 are selected and configured so that light hand force on the handle 27 will urge such handle 27 out of detent.

The housing 21 also has a stop face 209 formed therein so that when the handle 27 pivoted toward such face 209, the face 209 supports the handle 27 in a substantially horizontal position. And the housing 21 and stop mechanism 181 are configured so that the handle may be pivoted the other direction, i.e., toward the face 211 of the housing 21 and contact such face 211.

While the principles of the invention have been shown and described in connection with a few preferred embodiments, it is to be understood clearly that such embodiments are by way of example and are not limiting.

What is claimed:

1. In combination, a carpet cleaning machine and a platform for transporting the machine, the combination including:
   a machine-supporting platform base having first and second panels extending upwardly therefrom;
   a machine restraint mechanism for releasably coupling the machine and the platform to one another, such mechanism including a first restraining member on the first panel and a second restraining member on the machine, the restraining members being in horizontal sliding engagement with one another when the machine is mounted to the platform; and
   a wheel mounted with respect to the base for rolling the base and the machine across a surface.

2. The combination of claim 1 wherein the machine includes at least one brush having flexible bristles thereon and wherein the base includes:
   a brush contact surface; and
   a chock for supporting the machine, such chock extending above the surface by a dimension sufficient to prevent significant bending of the bristles.

3. The combination of claim 2 including two chocks spaced from one another and wherein:
   each of the chocks has a terminus;
   the brush has a length; and
   the spacing between the terminii is slightly greater than the length of the brush.

4. The combination of claim 1 wherein:
   the first restraining member is a projection;
   the second restraining member is a projection-receiving cavity;
   the projection and cavity separate and engage when the platform and machine are relatively-moved along a first axis; and
   the projection and cavity lock to one another when the platform and machine are relatively-urged along a second axis.

5. The combination of claim 1 wherein one of the restraining members is a pin mounted for reciprocal movement and the other restraining member is a socket for receiving the pin.

6. The combination of claim 1 wherein:
   the first restraining member is a pin mounted to the second panel for reciprocal movement with respect to the base; and
   the second restraining member is a socket on the machine.

7. The combination claim 1 further including a structure mounted with respect to the base for carrying equipment ancillary to carpet cleaning, the structure including:
   a rigid support device extending away from one of the panels; and
   a container mounted with respect to the support device and having at least one pocket for carrying equipment.

8. The combination of claim 8 wherein:
   the container includes a flexible body panel having surfaces which are exterior and interior when the container is mounted to the support device;
   the pocket is on the exterior surface; and
   the container includes a sleeve on the interior surface for slidably receiving the support device, thereby configuring the platform so that the container may be easily removed from and attached to the support device.

9. In combination, a carpet cleaning machine and a wheeled platform for transporting the machine and wherein the combination includes:
   a first restraint mechanism preventing relative movement of the platform and machine along a first axis, the first restraint mechanism including a socket on the machine and a thread-free pin mounted on the platform for horizontal sliding movement into and out of the socket;
   a second restraint mechanism preventing relative movement of the platform and machine along a second axis angular to the first axis.

10. The combination of claim 9 wherein the second restraint mechanism includes a tongue engaged with a groove when the machine is transported on the platform.

11. The combination of claim 9 wherein the platform includes a plurality of chocks for supporting weight of the machine when the machine and platform are mounted to one another.

12. In combination, (a) a carpet cleaning machine including at least one brush having flexible bristles thereon, and (b) a platform for transporting the machine, the platform including:
   a base supporting the machine;
   a restraint mechanism for releasably coupling the machine and the platform to one another; and
   a wheel mounted with respect to the base for rolling the base and the machine across a surface;
   and wherein the base includes:
   a brush contact surface; and a chock for supporting the machine, such chock extending above the surface by a dimension sufficient to prevent significant bending of the bristles.

13. The combination of claim 12 including two chocks spaced from one another and wherein:

each of the chocks has a terminus;

the brush has a length; and the spacing between the terminii is slightly greater than the length of the brush.

14. In combination, a carpet cleaning machine, and a platform for transporting the machine, the platform including:

a base supporting the machine;

a restraint mechanism for releasably coupling the machine and the platform to one another; and a wheel mounted with respect to the base for rolling the base and the machine across a surface;

and wherein:

the restraint mechanism includes a first restraining member on the platform for engaging a second restraining member on the machine;

and wherein:

the first restraining member is a projection;

the second restraining member is a projection-receiving cavity;

the projection and cavity separate and engage when the platform and machine are relatively-moved along a first axis; and the projection and cavity lock to one another when the platform and machine are relatively urged along a second axis, thereby substantially preventing movement of the machine away from the base.

15. In combination, a carpet cleaning machine and a platform for transporting the machine, the platform including:

a base for supporting the machine;

a machine restraint mechanism for releasably coupling the machine and the platform to one another;

a wheel mounted with respect to the base for rolling the base and the machine across a surface;

a structure mounted with respect to the base for carrying equipment ancillary to carpet cleaning;

and wherein the structure includes:

a rigid support device extending away from the base; and a container mounted with respect to the support device and having at least one pocket for carrying equipment;

and wherein:

the container includes a flexible body panel having surfaces which are exterior and interior when the container is mounted with respect to the support device;

the pocket is on the exterior surface; and the container includes a sleeve on the interior surface for slidably receiving the support device, thereby configuring the platform so that the container may be easily removed from and attached to the support device.

16. In combination, a carpet cleaning machine and a wheeled platform for transporting the machine and wherein the combination includes:

a first restraint mechanism preventing relative movement of the platform and machine along a first axis;

a second restraint mechanism preventing relative movement of the platform and machine along a second axis angular to the first axis;

and wherein:

the first mechanism includes a tongue aligned for engagement and disengagement with a groove when the platform and machine are relatively moved along the second axis.

17. The combination of claim 16 wherein the second mechanism is a pin aligned for engagement and disengagement with a socket.

18. In combination, a carpet cleaning machine and a wheeled platform for transporting the machine and wherein the combination includes:

a first restraint mechanism preventing relative movement of the platform and machine along a first axis;

a second restraint mechanism preventing relative movement of the platform and machine along a second axis angular to the first axis;

and wherein the platform includes:

a plurality of chocks supporting weight of the machine when the machine and platform are mounted to one another.

* * * * *